Dec. 13, 1932.    J. A. SHIVELY    1,890,952
MACHINE FOR APPLYING GUM STRIPS TO BEADS
Filed Dec. 21, 1929
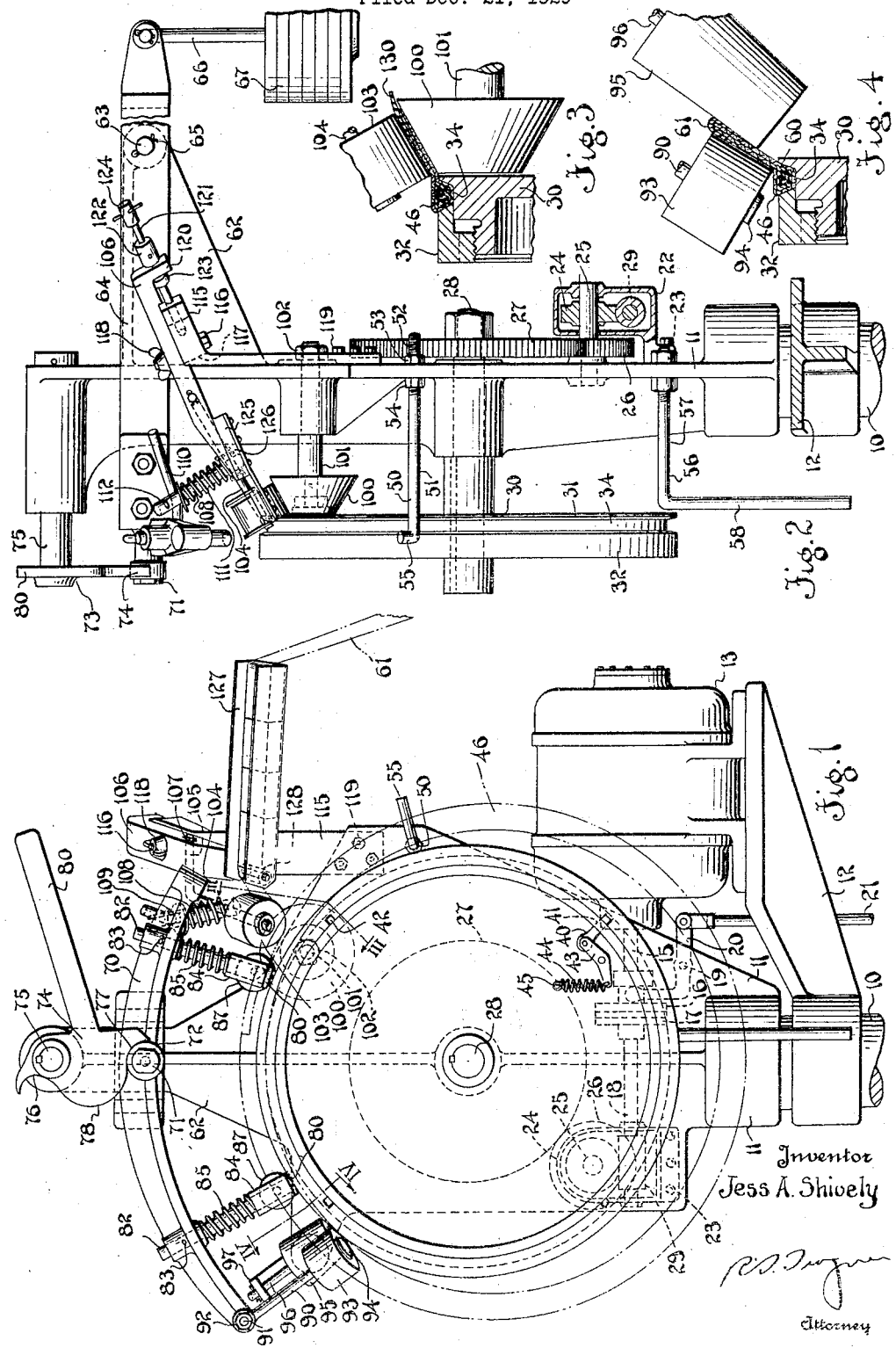
Inventor
Jess A. Shively Patented Dec. 13, 1932

1,890,952

UNITED STATES PATENT OFFICE

JESS A. SHIVELY, OF AKRON, OHIO, ASSIGNOR TO THE GOODYEAR TIRE & RUBBER COMPANY, OF AKRON, OHIO, A CORPORATION OF OHIO

MACHINE FOR APPLYING GUM STRIPS TO BEADS

Application filed December 21, 1929. Serial No. 415,847.

This invention relates to a machine for manufacturing beads and it has particular relation to a machine for applying a strip of unvulcanized rubber to the skirt of a bead.
An object of the invention is to provide an improved machine which will apply a rubber strip to the skirt of a bead and automatically cause the strip to be flipped about the outer edge of the bead skirt.
Another object of the invention is to provide a machine for applying a rubber strip to the skirt of a bead, which is so adjustable, that various sizes of beads may be accommodated.
It is ordinary practice to provide beads for pneumatic tires which have fabric flippers terminating in so-called skirt portions. Also, it is very desirable that the skirt of the bead be at least partially covered with a layer of unvulcanized rubber, in order that the bead may be more firmly secured within the tire casing. A machine for applying a rubber strip to a bead having such general characteristics is disclosed in the applicant's prior Patent 1,651,735. This invention constitutes an improvement over the machine disclosed in the aforesaid patent in that it is more particularly adapted to beads having normally tapered skirts and also in that it is quickly adjustable to different sizes of beads.
The invention comprises a frame having a grooved drum for supporting and rotating a bead partially disposed in the groove thereof. The drum comprises relatively movable sections adjustably secured together by reason of which the width of the groove may be varied. At circumferentially spaced points, with respect to the drum, a pair of conically faced rollers are rotatably supported by the frame. These rollers have different inclinations with respect to the plane of the drum in order that the skirt of the bead, which is supported by the rollers, may be disposed in differently tilted positions. Resilient rollers adapted to cooperate with the conical rollers maintain the skirt of the bead in contact with the latter rollers. Other rollers resiliently mounted upon the frame maintain the body portion of the bead in the groove of the drum. A strip of unvulcanized rubber is conducted between that pair of the rollers having the lesser degree of inclination with respect to the plane of the drum, and thereafter by reason of the fact that the skirt assumes a greater inclination the rubber strip is curled about the free edge of the skirt. The second pair of rollers not only assists in reverting the skirt of the bead to its normal position of greater inclination, but also serves to stitch the rubber strip to opposite sides of the skirt.
For a better understanding of the invention, reference may now be had to the accompanying drawing, forming a part of this specification, of which:
Fig. 1 is an elevational view of a machine constructed according to one form of the invention;
Fig. 2 is a side elevational view of the machine illustrated by Fig. 1;
Fig. 3 is a fragmentary cross-sectional view, on a larger scale, taken substantially along the line III—III of Fig. 1; and
Fig. 4 is a fragmentary cross-sectional view, on a larger scale, taken substantially along the line IV—IV of Fig. 1.
Referring to Figs. 1 and 2, the frame for the machine comprises a supporting post 10 terminating at its upper end in a vertically disposed frame plate 11. Also, a bracket 12 projects laterally from the upper end of the post 10 and provides a support for a motor 13. A shaft 15 projecting from the motor has a conventional clutch member 16 which is adapted for engagement with a corresponding clutch member 17 secured to a shaft 18. The clutch member 16 is splined to the shaft 15 and is movable to and from engagement with the clutch member 17 by an ordinary bell crank lever 20 pivoted to the frame plate 11 as indicated at 19, and which has a yoke engagement with a grooved portion of the clutch member 16. Preferably, the bell crank 20 is pivotally associated with a vertically disposed rod 21 which may be operatively connected to a treadle (not shown) at its lower end. The opposite end of the shaft 18 is provided with a worm 29 which is journalled in a housing 22 secured by bolts 23 to one side of the frame plate 11. This worm engages a worm wheel 24 which is rigidly secured to a shaft 25 journalled in the sides of the housing 22 and in the frame plate 11. A pinion 26 rigidly secured to the shaft 25 and disposed between the housing 22 and the frame plate 11 meshes with a relatively large gear 27 which is rigidly secured upon a shaft 28 journalled in a central portion of the frame plate 11. The end of the shaft 28 opposite to that on which the gear 27 is secured, supports a drum 30 having at its inner edge a radially outwardly projecting flange 31. The opposite edge portion of the drum 30 is threaded and engages a cylindrical sleeve 32 having a complementary threaded portion on its inner surface. It is apparent that rotation of the sleeve 32 with respect to the drum 30 affects separation or a movement together of the sleeve and the drum. The flange 31 and the adjacent edge of the sleeve 32, in conjunction with the base of the drum 30 at the side of the flange 31, provide a groove 34, the width of which may be adjusted. The sleeve 32 and drum 30 are retained in fixed positions by a pin 40 which projects through an opening 41 in the drum and into one of several axially disposed slots 42 in the sleeve. The pin 40 is pivotally secured to one end of a bell crank 43, and the opposite end of the latter is secured to one end of a spring 44. In turn, the opposite end of the spring is fastened to the frame plate 11 as indicated at 45.

The groove 34 is adapted partially to receive a bead 46 which is considerably larger in diameter than the diameter of the drum 30. Hence, the upper portion of the bead will rest in the groove, while the remaining portion of the bead will be disposed outside the groove. In order to maintain the bead in proper position, a guide member 50 is employed which comprises a rod 51 having a threaded end 52 engaging the frame plate 11 and which is adjustably maintained in position by nuts 53 and 54 engaging the threaded portion on opposite sides of the frame plate. The outer edge of the guide member 50 has an outwardly turned portion 55 which normally is aligned with that edge of the sleeve 32 defining one side of the groove 34. A second guide member 56 comprises a rod 57 adjustably secured to the frame plate in the same manner that the rod 51 is secured thereto. The rod 57 terminates in a downwardly projecting portion 58 which normally is aligned with the flange 31 defining the inner side of the groove 34. It is evident that the up-turned portion 55 of the guide member 50 and the downwardly projecting portion 58 of the guide member 56 contact with opposite sides of the bead and maintain it parallel with the groove 34.

The type of bead to which the invention is particularly adapted is illustrated in its normal position by Fig. 4. As thus positioned, the skirt 60 of the bead is tilted approximately 50° to the axis thereof. This skirt is formed by flipping a strip of fabric about the bead proper with projecting edge portions stitched together at the aforesaid angle. The skirt of the bead insures proper positioning of the latter in a tire in that it serves as an anchor which is disposed between plies of the latter. A gum strip 61 is folded about the outer edge of the skirt in order to provide an adhesive medium for firmly holding the skirt between such plies of the tire. The application of this gum strip to the outer edge of the bead is effected by means which now will be described.

The upper end of the frame plate 11 is provided with a rearwardly projecting portion 62 through which a pin 63 projects. A bifurcated member 64 pivotally supported upon opposite ends of the pin 63 is retained thereon by cotter pins 65 projecting through openings in the ends of the pin. The end of the member 64 most remote with respect to the frame plate 11, is pivotally secured to a depending rod 66 upon the lower end of which, counterweights 67 are provided. Hence, the opposite end of the member 64 normally is urged upwardly. The latter end of the member 64 is rigidly secured to an arcuate member 70 disposed above the drum 30 and which is substantially concentric thereto. Substantially central of its end the bar 70 has a stud pin 71 projecting therefrom upon which a roller 72 is journalled. Movement of the bar 70 and the end of the bar 64 downwardly against the action of the counterweight 67 is effected by means of a cam mechanism 73. This mechanism comprises a plate 74 secured to a pin 75 journalled in the upper portion of the frame plate 11 and which has, at opposite ends, curved recesses 76 and 77, which are connected by means of a reversely curved surface 78. The curved recess 76 is disposed adjacent the pivot 75 while the surface 78 and the recess 77 are located progressively greater distances from the pivot. A handle 80 integral with the plate 74 facilitates its movement. It is apparent that when the recess 77 is engaged with the roller 72 that the arcuate bar 70 is in its lowermost position, and that it is retained therein. Movement of the handle 80 upwardly permits the roller 72 to move upwardly and along the surface 78 until it engages the recess 76. It follows, that the bar 70 then is in its uppermost position.

The bar 70 at opposite sides of the pin 71 is provided with a pair of rods 82 which have portions projecting through the bar 70 and secured therein by pins 83. The lower ends of the rods 82 are square in cross-section and have slidable sleeves 84 thereon, that are maintained upon the rods by means of a collar 80. Each of these sleeves is urged downwardly toward the lower end of the bar by means of a spring 85 disposed between the sleeve 84 and the bar 70. Also, each sleeve 84 at one side thereof rotatably supports a roller 87 which partially projects below the lower end of the sleeve. The rollers 87 are adapted to contact with the bead 46 disposed in the groove 34 and maintain it firmly in position.

A rod 90 having an offset upper portion 91 threaded into one end of the bar 70 and retained positively in position by a nut 92 engaging the end of the threaded portion is provided on its lower end with a roller 93 which is retained on the rod by a collar 94. The roller 93 preferably is composed of resilient material such as rubber having an outer fabric covering. As best shown by Fig. 4, the roller 93 is of cylindrical shape and is so positioned that its axis is inclined approximately 50° to the horizontal. Such roller is adapted to contact with the outer surface of the skirt 60 of the bead 46, when the skirt is in its normal position. A metallic conical roller 95 adapted to cooperate with the roller 93 is journalled on a rod 96 which in turn is mounted in a bracket 97, secured to and projecting upwardly from the frame plate 11.

Adjacent the opposite end of the bar 70 a conical roller 100 is rotatably mounted upon a pin 101, which projects through the frame plate 11 and is secured thereto by a nut 102. The inclination of the conical surface of the roller 100 with respect to the horizontal is substantially less than that of the roller 95. In order that the skirt 60 of the bead, which also is supported by the roller 100, may be tilted substantially toward the axis of the bead, a roller 103 substantially identical with the roller 93 but tilted at a different angle with respect thereto, is rotatably supported upon the lower end of a rod 104 similarly to the manner in which the roller 93 is journalled on the rod 90. The upper end of the rod 104 has an off-set portion 105 loosely projecting through a block 106, and which is retained therein by means of a cotter pin 107 projecting through the free end of the offset portion. The outer end of the rod 104 and the roller 103 are normally urged downwardly by means of a pin 108 through the lower end of which the rod 104 projects, and which, at its upper end, has a bifurcated portion 109 slidably receiving a rod 110. A spring 111 encircles the rod 108 between the rods 104 and 110. The bifurcated end 109 of the pin 108 normally is retained engaged with the pin 110 by a cotter pin 112 projecting through the upper ends of the bifurcated portion. Preferably, the pin 110 is loosely mounted at one end in the bar 70, in order that the pin 108 may readily adjust itself to movement of the bar 70 and the rod 105.

The aforesaid block 106 is adjustably secured to an angle bracket 115 by a bolt 116 projecting through an elongate slot 117 in the bracket, and an opening in the block, and which is provided with a wing nut 118 upon its outer end. The angle bracket 115 is secured rigidly to the frame plate 11 by means of bolts 119. While the bolt 116 provides a means for adjusting the block 106 with respect to the bracket 115, it is desirable that mechanical means also be employed for making the adjustment. In order to effect this adjustment, the block 106 is provided with an offset portion 120 at its outer end through which a screw 121 rotatably projects and which is threaded at its lower end into the bracket 115. Collars 122 and 123 on opposite sides of the portion 120 of the block and which are rigidly secured to the screw, prevent slidable movement of the screw with respect to the block. The outer end of the screw is provided with a pin 124 for facilitating its operation.

The opposite end of the block has a laterally projecting portion 125, to the lower side of which, a plate 126 is secured. This plate at the end of the block supports a channel guideway 127 having a roller 128 journalled in the end thereof adjacent the roller 100.

In operation of the above-described mechanism, the bead 46 is disposed in the groove 34 and between the portions 55 and 58 of the guide members 50 and 56. Then the handle 80 is moved to its lowermost position which causes the bar 70 and the rollers carried thereby to be moved correspondingly downwardly. This results in engagement of the rollers 87 with the bead, and hence maintenance of the latter in the groove 34 of the drum 30. The roller 93 engages the skirt of the bead which contacts with the roller 95 and similarly the roller 103 engages the skirt of the bead which rests upon the roller 100. However, in the latter instance, the skirt of the bead is deflected radially inwardly to a considerable degree by the movement of the roller 103 downwardly. The gum strip 61 is directed through the guide channel 127 and over the roller 128. One end of the strip is stitched to the skirt of the bead prior to its passage between the rollers 103 and 100. The parts are so arranged and the gum strip so applied, that an edge portion 130 of the gum strip (Fig. 3) projects beyond the free edge of the skirt of the bead. Following movement of the skirt of the bead and the gum strip, between the rollers 103 and 100, the skirt reverts to its normal and inclined position, as shown by Fig. 4. Such movement of of the skirt to its inclined position is insured by the rollers 93 and 95. Moreover, this movement of the skirt of the bead increases its diameter progressively from one edge to the other following its passage between the rollers 103 and 100, and in the same manner increases the diameter of the gum strip. This increase in the diameter of the gum strip stretches it, and the strip naturally reacts by tending to revert to its unstretched condition.

In so reacting, the projecting portion 130 of the gum strip decreases in diameter and curls to the opposite side of the skirt. The curling of the gum strip occurs prior to its passage between the rollers 93 and 95 and the latter rollers then stitch both sides of the gum strip to the sides of the skirt. It may also be desirable to stretch the gum strip slightly prior to its conduction between the rollers 103 and 100, and this may be done manually by an operator slightly tensioning the strip as it is conducted through the guide channel 127.

It is evident from the foregoing description that an efficient machine has been provided for applying gum strips to the skirts of beads, and which will effectively apply such strips to the skirts of beads having normally inclined positions with respect to the axis of the bead. It is apparent that the machine is readily adjustable for different sizes of beads and that various adjustments can be made, in order to apply properly gum strips to the skirts thereof. By means of such a machine, very little time is required to apply a gum strip because of the fact that when the machine is once adjusted for a given size of bead, an operator need only perform a minimum number of operations.

Although only the preferred form of the invention has been described and illustrated, it will be apparent to those skilled in the art that the invention is not so limited, but that various modifications may be made therein without departing from the spirit of the invention or from the scope of the appended claims.

What I claim is:

1. In a machine for applying a rubber strip to a bead having a skirt which is normally frusto-conical in shape, means for rotating the bead, means for tilting the skirt from its normal shape and inwardly toward the axis of the bead, said means also being adapted to apply a rubber strip to the skirt of the bead while thus tilted, the strip being so applied that an edge thereof projects from the edge of the skirt, whereby reversion of the skirt to its normal shape results in curling of the projecting edge of the strip to the opposite side of the skirt, and means for stitching the strip to the sides of the skirt.

2. In a machine for applying a rubber strip to a bead having a skirt, means for supporting and rotating the bead, a pair of rollers having their adjacent peripheral surfaces inclined to the axis of rotation of the bead, said rollers being adapted to receive therebetween the skirt of the bead and the rubber strip applied thereto, and a second pair of rollers spaced from the first pair, and having their adjacent peripheral surfaces also inclined at an angle to the axis of the bead, but at a different inclination with respect to inclination of the adjacent surfaces of the first pair of rollers.

3. In a machine for applying a rubber strip to a bead having a skirt, a grooved drum for supporting and rotating the bead, means for retaining the bead within the groove with the skirt thereof disposed outside such groove, a pair of rollers having their adjacent peripheral surfaces inclined to the axis of rotation of the bead, said rollers being adapted to receive therebetween the skirt of the bead and the rubber strip applied thereto, and a second pair of rollers spaced from the first pair and having their adjacent peripheral surfaces also inclined to the axis of the bead but at a different inclination from that of the adjacent surfaces of the first pair of rollers.

4. In a machine for applying a rubber strip to a bead having a skirt, means for supporting and rotating the bead, a pair of rollers having their adjacent peripheral surfaces inclined to the axis of rotation of the bead, said rollers being adapted to receive therebetween the skirt of the bead and a rubber strip applied thereto, and a second pair of rollers spaced from the first pair, and having their adjacent peripheral surfaces also inclined at an angle to the axis of the bead, but at a different inclination from that of the adjacent surfaces of the first pair of rollers, each pair of rollers including a metallic conical roller and a resilient roller.

5. In a machine for applying a rubber strip to a bead having a skirt, means for supporting and rotating the bead, a pair of rollers having their adjacent peripheral surfaces inclined to the axis of rotation of the bead, said rollers being adapted to receive therebetween the skirt of the bead and a rubber strip applied thereto, and a second pair of rollers spaced from the first pair, and having their adjacent peripheral surfaces also inclined at an angle to the axis of the bead, but at a different inclination from that of the adjacent surfaces of the first pair of rollers, each pair of rollers including a conical roller and a roller having a resilient body.

6. The method of applying elongate strips of rubber to the skirts of beads, which comprises moving the skirt inwardly toward the axis of the bead, applying a strip of rubber to the outer side of the skirt while so positioned, with an edge of such strip projecting from the free edge of the skirt, and thereafter reverting the skirt to its normal position, which operation first tensions the projecting edge of the rubber strip and thereafter causes it to curl to the other side of the skirt.

In witness whereof, I have hereunto signed my name at Akron, in the county of Summit and State of Ohio, U. S. A., this 18th day of December, 1929.

JESS A. SHIVELY.